United States Patent [19]
Whitney

[11] Patent Number: 5,363,780
[45] Date of Patent: * Nov. 15, 1994

[54] APPARATUS AND METHODS FOR BURNING WASTE, AND WASTE SLURRIES

[75] Inventor: John P. Whitney, Benton, Ark.

[73] Assignee: Rineco Chemical Industries, Benton, Ark.

[*] Notice: The portion of the term of this patent subsequent to Dec. 21, 2010 has been disclaimed.

[21] Appl. No.: 169,636

[22] Filed: Dec. 20, 1993

Related U.S. Application Data

[63] Continuation of Ser. No. 788,194, Nov. 5, 1991, Pat. No. 5,271,340.

[51] Int. Cl.$^5$ .............................................. F23G 5/00
[52] U.S. Cl. ....................................... 110/346; 44/626; 110/238; 110/246; 239/398; 432/111; 588/252; 588/257
[58] Field of Search ................... 110/238, 246, 346; 431/284; 239/398, 434.5, 428, 427, 419.3; 44/626; 432/103, 111; 582/252, 257

[56] References Cited

U.S. PATENT DOCUMENTS

| 3,516,777 | 6/1970 | Hines et al. . |
| 3,939,297 | 2/1976 | Aylard et al. . |
| 4,001,031 | 1/1977 | McCord et al. . |
| 4,022,630 | 5/1977 | Watson et al. . |
| 4,052,138 | 10/1977 | Gieck . |
| 4,056,069 | 11/1977 | Marshall . |
| 4,102,278 | 7/1978 | McManama . |
| 4,143,603 | 3/1979 | Martin et al. . |
| 4,172,425 | 10/1979 | Sheridan . |
| 4,203,376 | 5/1980 | Hood . |
| 4,329,931 | 5/1982 | Burton . |
| 4,354,440 | 10/1982 | McRee, Jr. . |
| 4,395,290 | 7/1983 | Oller et al. . |
| 4,429,645 | 2/1984 | Burton . |
| 4,443,251 | 4/1984 | Reese . |
| 4,444,127 | 4/1984 | Spronz . |
| 4,477,260 | 10/1984 | Funk . |
| 4,481,891 | 11/1984 | Takeshita et al. . |
| 4,494,990 | 1/1985 | Harris . |
| 4,577,564 | 3/1986 | Tomita et al. . |
| 4,580,969 | 4/1986 | Brachet et al. . |
| 4,630,555 | 12/1986 | Guillaume et al. . |
| 4,631,026 | 12/1986 | McKinney . |
| 4,732,093 | 3/1988 | Hansen et al. . |
| 4,806,056 | 2/1989 | Rouse et al. . |
| 4,850,290 | 7/1989 | Benoit et al. . |
| 4,915,038 | 4/1990 | Sujata et al. . |
| 4,930,965 | 6/1990 | Peterson et al. . |
| 4,934,931 | 6/1990 | Angelo, II .................. 110/246 X |
| 4,946,475 | 8/1990 | Lipp et al. ................... 239/419.3 |
| 4,969,407 | 11/1990 | Benoit et al. . |
| 4,974,529 | 12/1990 | Benoit et al. . |
| 4,976,210 | 12/1990 | Dewald . |
| 5,022,332 | 6/1991 | Ding . |
| 5,058,513 | 10/1991 | Benoit et al. . |
| 5,078,593 | 1/1992 | Schreiber, Jr. et al. ........ 110/238 X |
| 5,078,594 | 1/1992 | Tutt et al. . |
| 5,083,516 | 1/1992 | Benoit et al. . |

Primary Examiner—Edward G. Favors
Attorney, Agent, or Firm—Oliff & Berridge

[57] ABSTRACT

Burners for burning waste, comprising a conventional fuel nozzle and a waste slurry nozzle. Waste slurry nozzles, comprising a first conduit, a second conduit and an acceleration zone comprising a mixing chamber and an acceleration conduit. Waste slurries comprising a continuous phase and a solids phase, the solids phase consisting essentially of solids having at least one dimension less than about ⅛ inch and solids having no dimension less than ⅛ inch and no dimension larger than about ⅝ inch. Methods for burning waste, comprising feeding a slurry of cement raw materials to an up end of a rotating kiln, and ejecting a waste slurry from a burner such that a portion of the waste slurry lands in the calcining zone of the kiln.

21 Claims, 5 Drawing Sheets

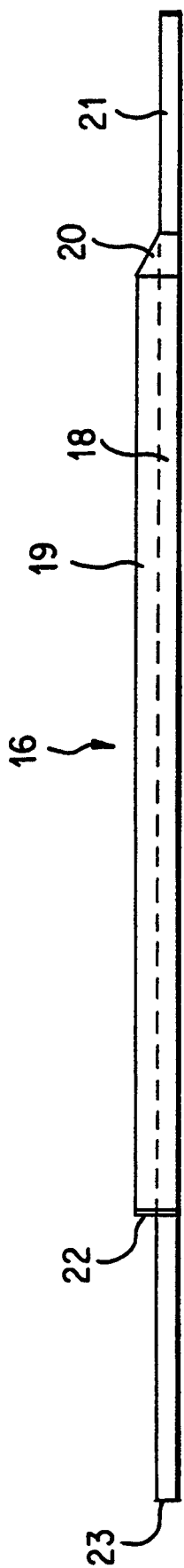
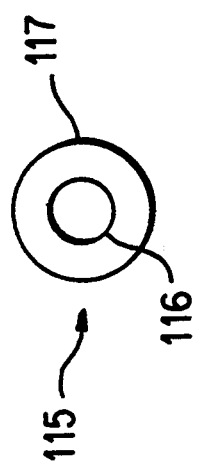
FIG. 2
FIG. 3

5,363,780

APPARATUS AND METHODS FOR BURNING WASTE, AND WASTE SLURRIES

This is a continuation of application Ser. No. 7/788,194 filed on Nov. 5, 1991, now U.S. Pat. No. 5,271,340.

BACKGROUND OF THE INVENTION

1. Field of the Invention

The present invention relates to kilns, to nozzles for kilns, and to waste slurries, more particularly, to methods of burning waste slurries in cement kilns, and to waste slurries, kilns and kiln nozzles for use in such methods. The present invention is especially useful in connection with waste slurries containing hazardous waste.

2. Description of the Prior Art

Many types of solid combustible waste generated by industry and elsewhere are categorized as hazardous waste because of, e.g., their flammable or toxic characteristics. Recent environmental regulations have imposed strict restrictions on disposal of hazardous waste, frequently making it necessary to employ expensive high-temperature incinerators with extentive emission control devices.

Cement kilns have received favorable review from federal and state environmental regulatory agencies as providing ideal conditions for disposal of combustible waste materials. Not only does the burning of hazardous waste in operating kilns allow for recovery of energy values from hazardous waste, but also, because of their high operating temperatures, long residence time and ability to provide favorable conditions for chemical combination of inorganic residues into the active components of cement, such operations provide excellent conditions for environmentally sound disposal of combustible hazardous waste.

The burning of hazardous waste, however, faces a number of practical limitations. Before the promulgation of existing EPA air quality regulations, it was a practice to charge combustible solid waste into the cold end of cement kilns with the mineral materials being processed into cement. With current regulations, however, it would be impossible to follow such practices. Combustible hazardous waste contains many volatile organic substances, which would result in unacceptable hydrocarbon emissions because the volatile components are driven off into effluent gases at temperatures below those required for thermal degradation of the volatilized components.

One attempt to provide a system in which hazardous waste can be burned in a cement kiln is disclosed in U.S. Pat. No. 4,974,529. In accordance with the method disclosed in that patent, hazardous waste is containerized and fed into a kiln through a port formed in the kiln wall, the port being aligned with a drop tube inside the kiln. Hazardous waste fuel is delivered to the kiln through the port at predetermined times during operation of the kiln. This method is inconvenient and complicates the design of kilns, and it requires introduction of the fuel in uneven pulses.

U.S. Pat. No. 4,806,056 discloses an apparatus and a method for using materials such as coarse pieces of pneumatic tire casings as a secondary source of heat energy in applications such as lime kilns, cement kilns, boiler furnaces and the like. Hazardous waste sludges can be metered to mix and coat the surfaces of tire-derived fuel so that the hazardous materials can be fed into a cement kiln. The patent notes that in order to dispose of some hazardous wastes safely, it is necessary to expose them to sufficiently high temperatures for long enough periods of time. According to the patent, for delivery of tire-derived fuel for use in cement kilns and lime kilns, it is preferred to deliver the fuel pneumatically through a large pipe, the size of which must be adequate to permit passage of the pieces of tire-derived fuel without being clogged. Referring to FIG. 6, air is fed through an exit mouth 64 to a fuel delivery conduit 54, taking along with it comminuted tire-derived fuel 48 delivered through an infeed conduit 56. In one preferred application, shown in FIG. 8, the stream of air and tire-derived fuel proceeds through nozzle 70 and is discharged into the combustion chamber of a lime kiln 72.

U.S. Pat. No. 4,976,210 discloses a method and apparatus for treating hazardous waste materials in which bulk material such as heavy solid hazardous waste material is supplied via a hopper to a hydraulic ram 28 (see FIG. 1) or is supplied via a flow line and pumped into the intake 18 of the kiln.

SUMMARY OF THE INVENTION

One object of the present invention is to provide apparatus and methods which can be used to efficiently burn waste material in a cement kiln without having adverse effects on the cement or on the environment.

Another object of the present invention is to provide waste slurries which can be efficiently burned using such apparatus.

Another object is to provide a method of conveying combustible solids into an area of the kiln where complete combustion may result in forming an intermediate char, then oxidation of the fixed carbon without detrimental consequences in the local and temporary reducing atmosphere.

In accordance with the present invention, there are provided waste slurries comprising a continuous phase and a solids phase, the solids phase consisting essentially of solids having at least one dimension less than about ⅛ inch and solids having no dimension less than ⅛ inch and no dimension larger than about ⅝ inch.

In addition, there are provided methods for burning waste, comprising:
feeding a slurry of cement raw materials to an up end of a rotating kiln having the up end and a down end, a calcining zone between the up end and the down end and a clinkering zone between the calcining zone and the down end; and
ejecting a waste slurry from a burner at the down end into the clinkering zone such that a portion of the waste slurry lands in the calcining zone.

There are also provided methods of injecting solid waste into a kiln by adding the solid waste to liquid flowing to a pump intake and using the liquid to convey the solid waste, and burning in suspension solid waste which has at least one dimension less than about ⅛ inch and burning solid waste having all dimensions greater than ⅛ inch in a calcining zone of the kiln.

There are also provided burners for burning waste, comprising a conventional fuel nozzle and a waste slurry nozzle.

There are also provided waste slurry nozzles, comprising:
a first conduit having an inlet and an outlet, a second conduit having an entrance and an exit; an acceleration zone comprising a mixing chamber and an acceleration conduit, the mixing chamber having an intake end and a release end, the acceleration conduit having a receiving end and a discharge end, the intake end of the mixing chamber communicating with the outlet of the first conduit and the exit of the second conduit, the release end of the mixing chamber communicating with the receiving end of the acceleration conduit.

The invention may be more fully understood with reference to the accompanying drawings and the following description of the embodiments shown in those drawings. The invention is not limited to the exemplary embodiments and should be recognized as contemplating all modifications within the skill of an ordinary artisan.

BRIEF DESCRIPTION OF THE DRAWINGS

FIG. 2 is an enlarged view of the waste slurry nozzle 16 depicted in FIG. 1.

FIG. 3 is a cross-sectional view of a preferred burner in accordance with a second embodiment of the present invention.

DETAILED DESCRIPTION OF THE PREFERRED EMBODIMENTS

In accordance with one aspect of the present invention, there is provided a system which can employ a conventional cement kiln (either a "wet" type or a "dry" type) in a method which uses hazardous and/or non-hazardous waste to provide part of the fuel requirement. The term "waste" is used herein to mean by-products of a process, such by-products being of a nature that the operator of the process desires to dispose of them. This invention is particularly adapted to employing hazardous waste. The phrase "hazardous waste" is defined herein in accordance with prevailing governmental codes. Under current prevailing codes, materials such as sludges from sewage treatment mills, food processing waste materials, pulp and paper industry waste material and rubber wastes are all non-hazardous waste materials. Refinery oil/water separator sludges may or may not contain hazardous waste.

Conventional cement kilns are typically large inclined cylinders, into the "up" end of which cement raw materials are fed. The cement raw materials go through physical and chemical changes as they pass through the kiln from the up end to the "down" end, where they are discharged as hot lava material (clinker) into a cooler and recovered. A burner is positioned in the down end of the kiln to provide very high temperatures within the kiln. Hot gases travel counter-current relative to the cement raw material, from the down end of the kiln to the up end. The present invention provides a system whereby waste, especially hazardous waste, can be used as part of the fuel being burned by the burner without degrading the quality of the clinker, without having environmentally unacceptable effluent and without damaging the kiln.

Figure 1:
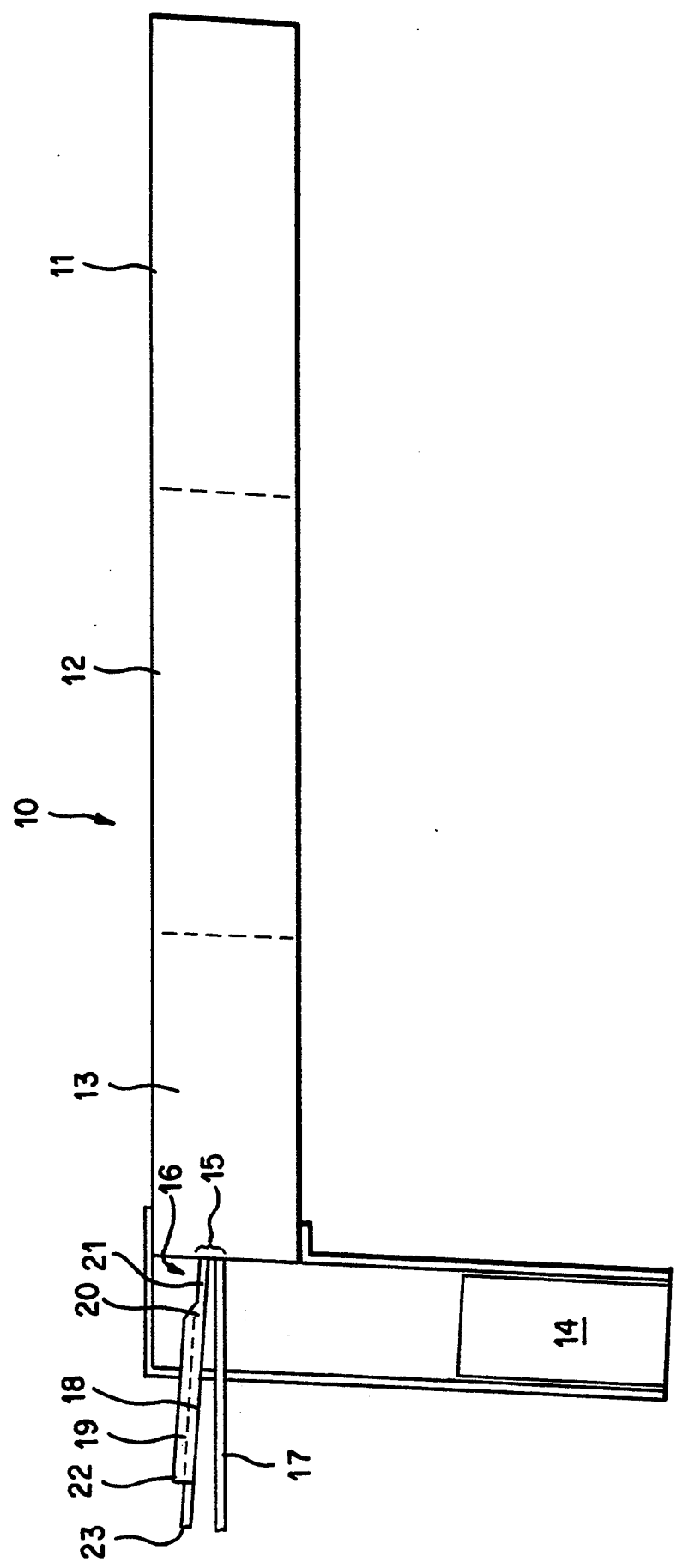
FIG. 1 is a perspective view of a waste burning system in accordance with the present invention.

FIG. 1 depicts a system in accordance with the present invention, the system employing a conventional "wet" cement kiln comprising a large cylindrical kiln 10. The present invention is equally applicable to a system in which there is employed a "dry" cement kiln, i.e., a kiln which includes an apparatus for preheating or precalcining the mineral material.

A suitable size for the cylinder depicted in FIG. 1 is a diameter in the range of from about 11 to about 14 feet and a length of from about 350 to about 500 feet. Raw cement materials are fed into the up end of the kiln as an aqueous slurry containing raw materials suitable for making cement. The aqueous slurry preferably contains limestone, water, sand, clay, shale, and/or any other material(s) suitable for making cement. The aqueous slurry preferably contains from about 14 to about 18 weight percent, most preferably about 16 weight percent, solids. Gases passing in the opposite direction are at a temperature on the order of about 575° F. at the up end of the kiln 10. The kiln 10 is continuously rotated at a rate of from about 1 to about 2 rotations per minute.

As the cement slurry begins to pass through the kiln 10 toward the down end, it enters a chain gate section 11 where large chains resembling light-weight naval anchor chain and of lengths approximately equal to the diameter of the kiln 10 are attached around the entire circumference of the kiln 10. As the kiln 10 rotates, the chains become coated with the cement slurry, rise to the top of the kiln 10 and provide a large surface area for heat exchange and mass exchange. At the down end of the chain gate section 11, as a result of evaporation in the chain gate section 11, the cement slurry is substantially free of non-chemically bound water, and is at a temperature on the order of about 500° F. The gases passing in the opposite direction are at a temperature on the order of about 1000° F. at the down end of the chain gate section 11.

As the cement material continues passing through the kiln 10, it next enters a calcining zone 12. The calcining zone 12 is a severe endothermic zone. The cement material includes a high percentage of calcium carbonate, so that waters of crystallization, water of hydration and carbon dioxide are driven off to produce anhydrous material which is then at a temperature on the order of about 2250° F. The gases passing through the calcining zone 12 in the opposite direction are at a temperature on the order of from about 1400° F. to about 2300° F.

The anhydrous cement material next passes into a clinkering zone 13, where it melts and coats the walls of the rotating kiln 10. The cement material is exothermic, chemically active, and at a temperature on the order of from about 2650° F. to about 2700° F. The cement material crystallizes at the end of the exotherm and is discharged from the down end of the kiln 10 as a hot crystallized lava material (clinker).

From the down end of the kiln 10, the clinker drops down into one or more clinker coolers 14 in which it is cooled by heat exchange with air driven by any suitable means, such as by a fan, the air passing in the opposite direction through the clinker cooler(s) 14. The cooled clinker is recovered and the air heated in the clinker cooler(s) 14 is passed into the kiln 10 where it is used as secondary air for combustion inside the kiln 10. The secondary air is at a temperature on the order of from about 900° F. to about 1700° F., typically about 1400° F.

A burner 15 fires into the secondary air from the clinker cooler(s) 14 in a direction opposite to the direction in which the cement slurry moves through the kiln 10. In the embodiment shown in FIG. 1, the burner consists of two fuel outlets positioned side-by-side and aligned such that their axes intersect a short distance into the kiln 10 from the down end of the kiln 10. Those two fuel outlets are a waste slurry nozzle 16 and a conventional fuel nozzle 17. The waste slurry nozzle 16 is preferably positioned such that the stream flowing therefrom impinges the flame emanating from the conventional fuel nozzle 17. In accordance with a second embodiment in accordance with the present invention, the waste slurry nozzle 116 and the conventional fuel nozzle 117 are arranged substantially coaxially, as depicted in FIG. 3, with the conventional fuel nozzle 117 surrounding the waste slurry nozzle 116.

The fuel supplied to the conventional fuel nozzle 17 can comprise any suitable conventional fuel, preferably a moderate BTU material, such as coal (e.g., lignite), petroleum coke, waste dry fuel and the like.

The waste slurry in accordance with the present invention has a continuous phase and a solids phase. The continuous phase may include air and/or conventional liquid fuel used in cement kilns. When using air as the continuous phase, the flow of air is preferably from about 50 to about 225 weight percent, based on the amount of solids phase, more preferably from about 125 to about 150 weight percent. When using air as the continuous phase, at least about 50%, typically about 75%, of the waste slurry burns in suspension (in the flame emanating from the burner). When using a liquid as the continuous phase, the liquid(s) (e.g., waste hydrocarbons, waste liquids containing combustible hydrogen and carbon, waste fuels, hydrocarbon solvents and petroleum oils) have about 10 to about 20 weight percent of dissolved or suspended solid or semi-solid material such as oils, greases, resins, adhesives, and the like ground up very small. The solid material particle size for the continuous phase is colloidal to the extent possible and is of relatively low viscosity, i.e., between about 100 centipoise and about 500 centipoise, however, higher viscosity up to 10,000 centipoise can be used. The solids phase of the waste slurry in accordance with the present invention can include two types of solids. The first type of solids is shredded solids which have at least one dimension which is less than about $\frac{1}{8}$ inch. Such solids can include plastics, such as plastic containers, visqueen dripcloths, respirator cartridges, spent safety clothing (e.g., boots, gloves, Tyvek® suits), and can include other materials, such as small paint containers with their contents (e.g., pint paint cans), semi-solid paint heels or skins from the tops of containers, semi-solid adhesives, resins and copolymers that are either fully or partially reacted, epoxies, urethanes, acrylics, polyesters, and/or any other type of plastic or polymer material. The second type of solids that can be present in the solids phase in accordance with the present invention includes solids which have no dimension less than $\frac{1}{8}$ inch and no dimension larger than $\frac{3}{8}$ inch. Such materials can include ground, fully-reacted resins, cured paint rims from plastics drums (e.g., a 55 gallon plastic drum) which have been shredded, clean-up material, plastic, wood, carbon, agglomerated materials, etc. Such materials are typically roughly spherical.

The waste slurry nozzle 16 and the conventional fuel nozzle 17 are made of a material which can withstand the high temperatures within the kiln 10. An especially preferred material for their construction is stainless steel.

The shape of the conventional fuel nozzle 17 can be any suitable shape which effectively provides the desired flow rate of conventional fuel to the kiln 10. Desired flow rates for the conventional fuel depend on several factors, as discussed below.

The shape of the waste slurry nozzle 16 is critically important to operation in accordance with the present invention for several reasons.

First, the flame emanating from the burner 15 must be very long and narrow, extending at least about 70 feet long so that it extends to the exothermic zone without impinging on the walls of the kiln 10. In the exothermic zone, the cement material coats the walls of the kiln 10 which transmits enough heat through the cement material that it crystallizes against the walls of the kiln 10. If the heat in that region is increased, the cement material coating on the walls of the kiln 10 becomes thinner, and the flame will eventually impinge and abrade the walls. If that region becomes cooler, the cement material coating will become thicker and build up a ring which will restrict or prevent movement of the cement material through the kiln 10.

Second, any solids which are not burned in suspension in the flame must be accelerated to a high enough velocity that they fly out the end of the flame and land in the calcining zone 12, where they are burned. In order to reach the calcining zone, such solids must travel from about 70 to about 200 feet, for example, about 120 feet. The substantially spherical solids which have no dimension less than $\frac{1}{8}$ inch and no dimension larger than $\frac{3}{8}$ inch typically are incapable of being burnt in suspension. After such solids go through the flame, they produce pieces of char or fixed carbon, a very powerful reducing material resembling coke in a blast furnace. If these solids land in the clinkering zone 13, they tend to reduce the clinker, thereby causing the clinker to be unacceptably discolored. The remainder of the material in the waste slurry, i.e., any liquid in the continuous phase, the fine particulate and the particulate material having at least one dimension that is on the order of $\frac{1}{8}$ inch or smaller, generally all burn in suspension in the flame.

Third, the waste slurry nozzle 16 must be able to pass all of the solids contained in the waste slurry without plugging up, even when operating at relatively low flow rates and pressures.

The waste slurry nozzle 16 of the embodiment depicted in FIG. I is shown in an enlarged view in FIG. 2, and it comprises a substantially cylindrical waste conduit 18, a substantially cylindrical air conduit 19, a mixing chamber 20 and a substantially cylindrical acceleration conduit 21. An air inlet 22 is formed in the air conduit 19 and a waste slurry inlet 23 is formed in the waste conduit 18. The waste conduit 18 and the acceleration conduit 21 are substantially coaxial. In the embodiment shown in FIG. 2, the waste conduit 18 is positioned within the air conduit 19 and has an axis parallel to the axis of the air conduit 19. The mixing chamber 20 communicates on its intake end with both the waste conduit 18 and the air conduit 19, and on its release end with the acceleration conduit 21. The mixing chamber 20 tapers relatively gradually, preferably such that the ratio of the difference between the cross-sectional areas of the intake end and the release end of the mixing chamber 20, divided by the distance between the intake end and the release end of the mixing chamber 20, is in the range of from about 0.5 to about 2.0, and is preferably about 1.0. The length of the acceleration zone, which includes the mixing chamber 20 and the acceleration conduit 21, is critically important, and preferably is in the range of from about 10 to about 30 times the diameter of the acceleration conduit 21. The length of the waste slurry conduit 18 and the length of the air conduit 19 must be sufficient to position the end of the acceleration conduit 21 at the desired location within the kiln 10.

The solids phase of the waste slurry can be fed to the waste conduit 18 by any suitable means and at any appropriate location. One preferred way is to feed the solids phase to the intake of a pump, using the continuous phase being pumped by the pump to convey the solids phase. There is preferably provided a means for facilitating adding the solids phase, for example, a funnel or hopper means, or primer chamber.

In the embodiment depicted in FIG. 1, the interior diameter of the acceleration conduit 21 is preferably in the range of from about 1.0 inches to about 2.5 inches, most preferably on the order of about 2.0 inches. The interior diameter of the waste conduit 18 is preferably in the range of from about 1.25 inches to about 2.5 inches, most preferably on the order of about 2.0 inches. The interior diameter of the air conduit 19 (in which the waste conduit 18 is positioned) is preferably in the range of from about 3.0 inches to about 5.0 inches, most preferably on the order of about 4.0 inches, and it is typically at least about 2 times the diameter of the waste conduit 18.

In accordance with a specific preferred embodiment, the air conduit 19 is formed of 3 inch interior diameter stainless steel pipe and is 87.5 inches long, the air inlet 22 being 4 inches from the closed end of the pipe; the waste conduit 18 is formed of 1.5 inch interior diameter carbon steel pipe and is 115.5 inches long; the mixing chamber 20 tapers from a 3 inch interior diameter at its intake end to a 1.25 inch interior diameter at its release end and is 3.5 inches long; and the acceleration conduit 21 is formed of 1.25 inch interior diameter stainless steel pipe and is 26.5 inches long.

By providing a waste slurry nozzle in accordance with the present invention, there is a sufficient length during which energy exchange takes place and the mixing chamber and acceleration conduit are shaped such that a waste slurry containing solids having at least one dimension less than about $\frac{1}{8}$ inch and solids having no dimension smaller than $\frac{1}{8}$ inch and no dimension larger than $\frac{3}{8}$ inch is accelerated by the air fed through the air conduit 19 so that they are travelling at a rate of at least 75%, preferably close to 100%, of the rate of the air when the air exits from the acceleration conduit 21. The waste slurry nozzle according to this invention disintegrates and entrains agglomerated solids in the waste slurry. In the embodiment shown in FIG. 1, the flame is co-current with the secondary air from the clinker cooler(s) 14, which is typically travelling at a rate of about 20 miles per hour, so that the flame is firing down-wind with the gases in the kiln 10. The secondary air entering the kiln 10 around the flame is very reactive, thereby providing a high flame speed because relatively little heat is dissipated from the flame to the oxygen and nitrogen in the preheated secondary air.

The preferred pressure of the air supplied to the air conduit 19 depends on the geometry of the various elements of the system, and is preferably in the range of from about 35 psi to about 95 psi, most preferably about 65 psi. When employing a waste slurry having a liquid continuous phase, the mass flow rate of air supplied to the air conduit 19 is preferably in the range of from about 0.20 to about 0.50 weight percent, most preferably about 0.24 to 0.25 weight percent, based on the mass flow rate of waste slurry. Preferred air flow rates are in the range of from about 280 SCFM (standard cubic feet per minute) to about 800 SCFM, most preferably on the order of about 500 ft$^3$/min. When employing a waste slurry having a continuous phase which comprises air, the flow rate of air supplied to the air conduit 19 is preferably in the range of from about 700 to about 1500 SCFM.

Preferred waste slurry flow rates are on the order of from about 54 lb/min to about 200 lb/min, most preferably about 140 lb/min. The waste slurry nozzle 16 is preferably designed to accommodate flow up to 360 lb/min of waste slurry with 1500 SCFM of air.

The pressure under which waste slurry is supplied to the waste slurry conduit 18 only needs to be sufficient to feed the waste slurry to the mixing chamber 20, and it should not exceed the pressure of the air supplied to the air conduit 19 because if it does, there may be a tendency for some of the air to be forced backward.

The end of the acceleration conduit 21 may optionally have a small flame guide to provide a desired adjustment of the width and/or length of the flame.

The ratio between the amount of waste slurry and the amount of conventional fuel entering the kiln 10 through the waste nozzle 16 and the conventional fuel nozzle 17, respectively, affects the temperature gradient within the kiln 10. Conventional fuel has a relatively low hydrogen content, whereas waste slurry (particularly hazardous waste slurry) has a relatively high hydrogen content. Because $H_2O$ produced absorbs more heat and carries more heat downstream than does $CO_2$, the temperature gradient depends on the ratio between the two fuel elemental components. By adjusting the carbon:hydrogen ratio, 80 to 100% substitution of waste slurry fuel for conventional fuel can be achieved.

The various aspects of the various embodiments of the present invention provides numerous advantages over the prior art. For example, by burning some of the solids phase in the flame (i.e., in suspension), several advantages can be obtained. First, only about 15% to about 20% of the total energy input to a wet process kiln can be input to the calcining zone, and by burning some of the solids in the flame, energy can be released in the flame, so that only a portion of the energy resulting from the solids is released in the calcining zone. Thus, more energy can be input using the solids, and more solids can be consumed in the kiln. Second, because heat transfer in the clinkering zone is to materials on the walls of the kiln, it is important to have a radiant (highly luminous) flame with much radiant heat-burning solids facilitates this type of flame.

As an additional example, many advantages are obtained when the continuous phase of the waste slurry is liquid instead of, e.g., air. First, very frequently, solids are not of high enough BTU content to maintain high flame speed. Using a liquid continuous phase, a high flame speed can be maintained. Second, very frequently, solids have a high carbon:hydrogen ratio. A better carbon:hydrogen ratio can be obtained using a liquid continuous phase. Third, having the surfaces of solids covered with liquid material can accelerate ignition and burning of the solids. Fourth, a much wider selection of solids can be burned when using liquid continuous phase than when using air as a continuous phase.

Figure 4:
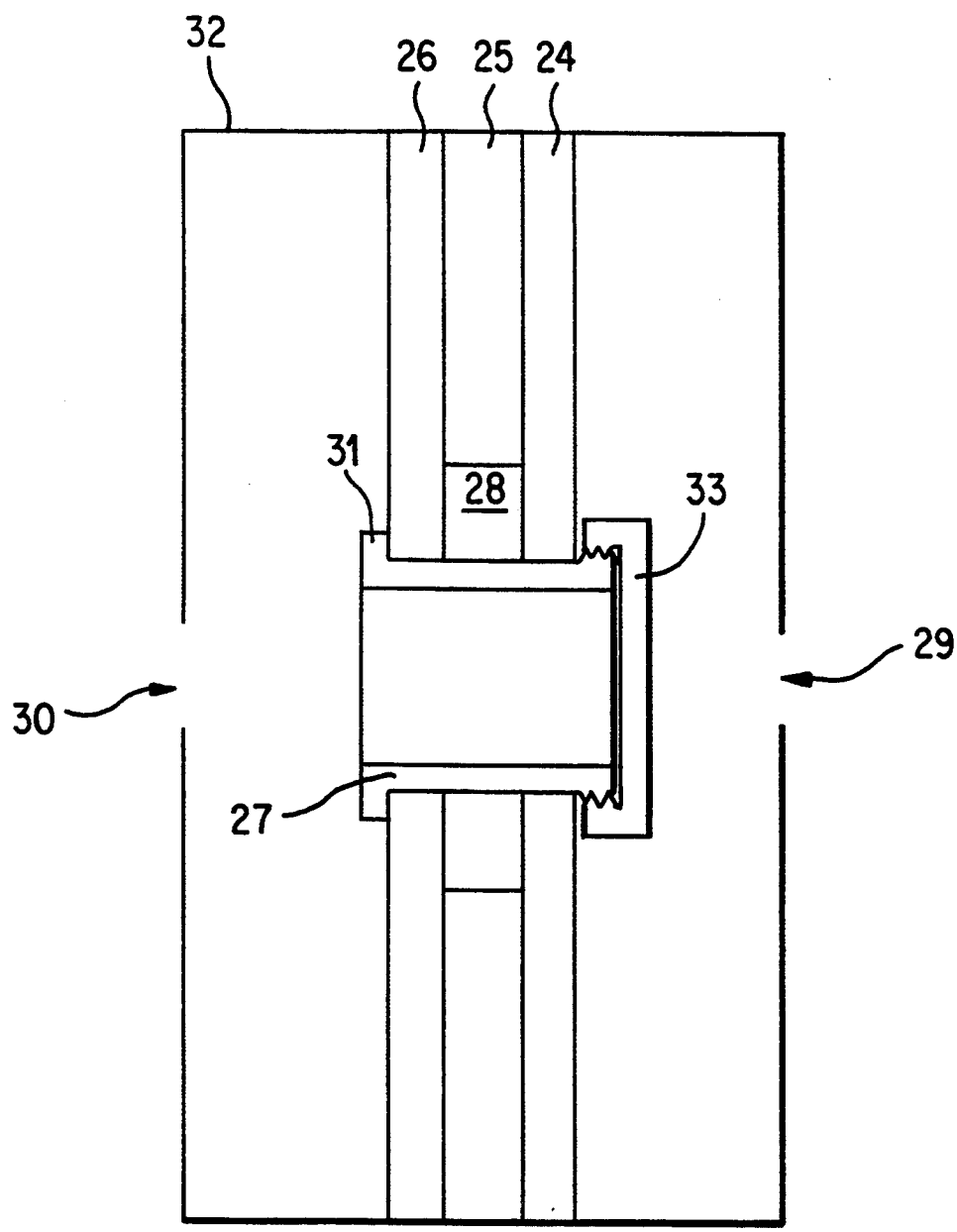
FIG. 4 is a cross-sectional view of a pipe grinder used in accordance with a preferred aspect of the present invention.
Figure 5:
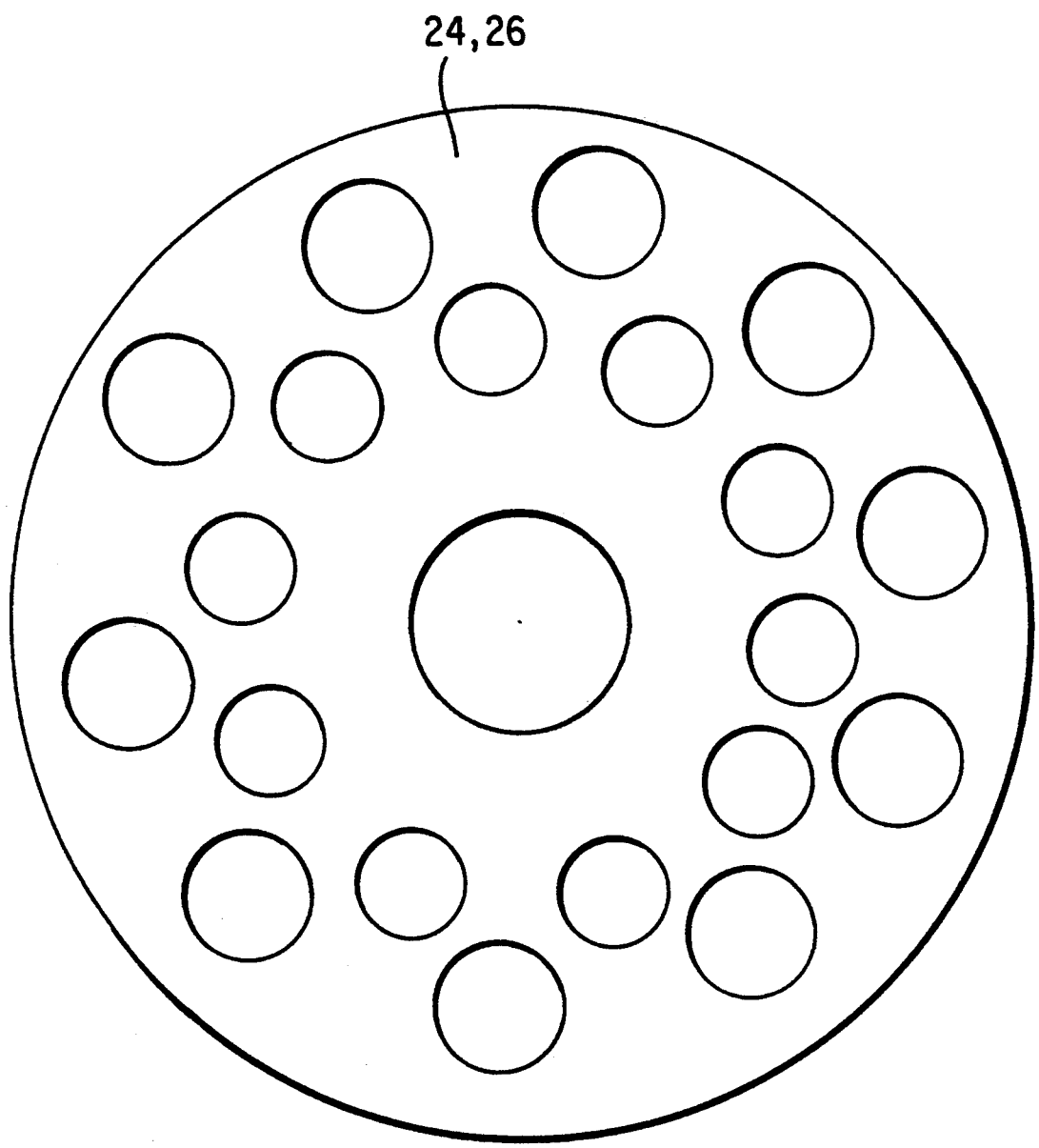
FIGS. 5 and 6 are front views of discs in the pipe grinder depicted in FIG. 4.
Figure 6:
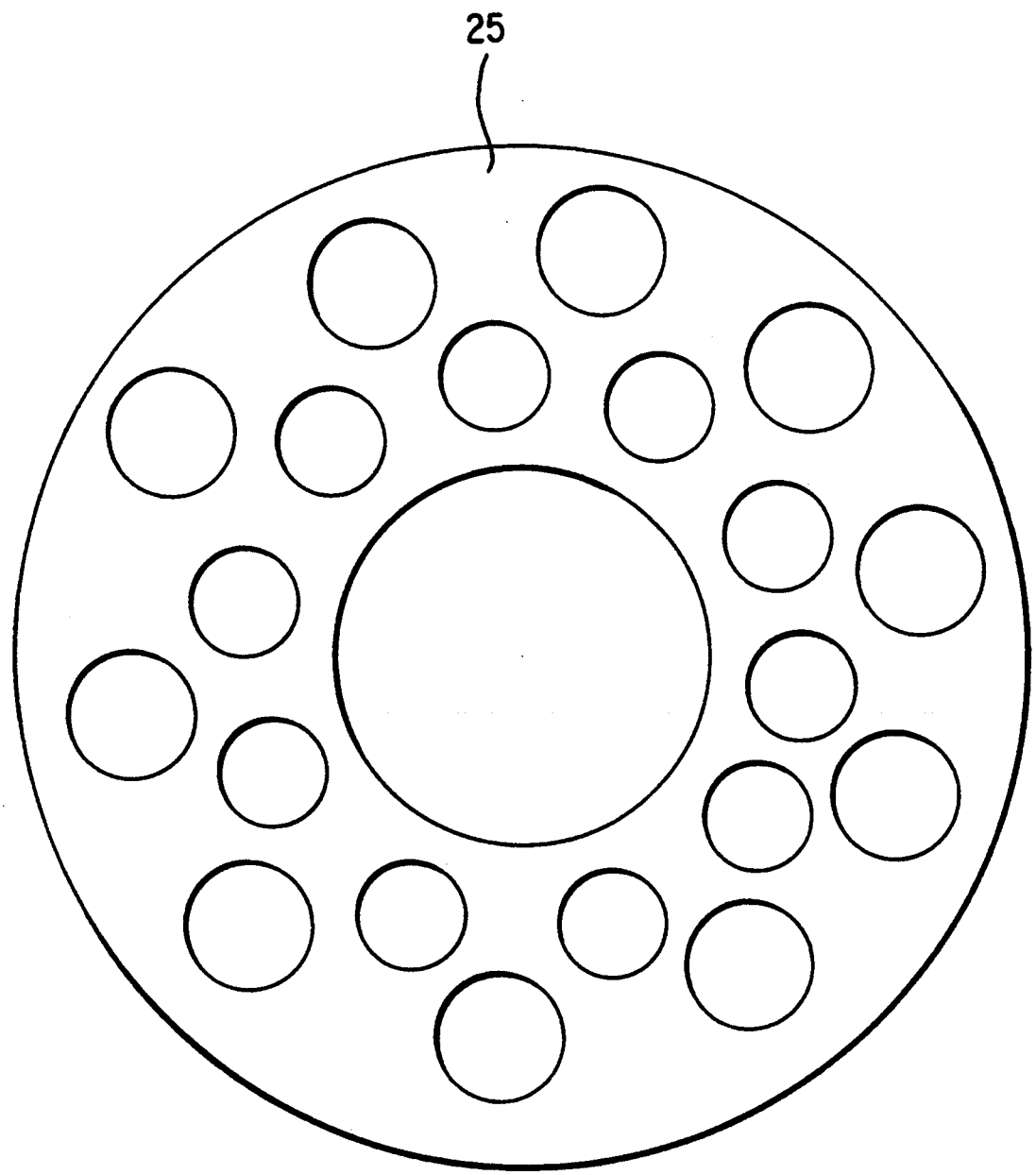

In accordance with a preferred feature of the present invention, the waste slurry may be prepared by passing a raw waste slurry through a pipe grinder as depicted in FIGS. 4-6. The pipe grinder includes first and third discs 24, 26 splined to a spindle 27, each of the discs 24, 26 having holes formed therethrough (as shown in FIG. 5). Positioned between the first and third discs 24, 26 is a second disc 25 rotatably mounted on a spacer 28 which is splined to the spindle 27, the second disc 25 also having holes formed therethrough (see FIG. 6). The discs 24, 25, 26 and the spacer 28 are secured in place between a shoulder 31 on the spindle 27 and a cap 33 which is screw-threaded onto the spindle 27. The discs 24, 25, 26 abut one another, such that in operation, there is only a thin film of the material being comminuted between the discs. In operation, the spindle 27 is rotated, together with the first and third discs 24, 26 and the spacer 28, preferably at a rate of from about 80 to about 1750 revolutions per minute. Raw waste slurry is fed, e.g., by a pump into an inlet chamber 29 adjacent to the first disc 24, passes through the holes in the first disc 24, then through the holes in the second disc 25, and finally through the holes in the third disc 26, after which it exits through an outlet 30. This treatment reduces the sizes of solids contained in the raw slurry.

The first, second and third discs 24, 25, 26 are positioned within a cylindrical housing 32 such that the peripheral surfaces of the discs 24, 25, 26 fit snugly within the housing 32. For example, the clearance between the peripheral surfaces of the discs and the housing may preferably be about 50 or fewer thousandths of an inch. The clearance is preferably smaller than the diameter of the largest particle size desired in the effluent from the comminuting apparatus. To reduce the clearance, it is possible to line the housing with any suitable material, e.g., ultra high molecular weight polyethylene, available from Hoescht Celanese.

The discs 24, 25, 26 are formed of a material of suitable mechanical properties such that they can withstand the conditions to which they are subjected during comminuting. Such conditions depend, for example, on the nature, flow rate and pressure of the material being comminuted, the rate of rotation of the discs and the sizes of the discs. For example, suitable materials out of which the discs 24, 25, 26 can be constructed include steel and other durable metals and alloys, ceramics and polymer materials. Preferred materials include "work-harder" materials, i.e., materials which become harder as the apparatus is used. Any suitable coating may be applied to the surfaces of the discs 24, 25, 26, the spindle 27 or the spacer 28 to provide increased durability. For example, high molecular weight polymers, e.g., ultra high molecular weight polyethylene (available from Hoescht Celanese), may be used as suitable coatings.

Referring to FIGS. 5 and 6, the discs 24, 25, 26 each have a plurality of holes (in addition to the one through which the spindle passes) formed through the thickness of the disc. The holes may be of any suitable shape, and circular holes are preferred. A disc which is upstream relative to a more downstream disc preferably has holes which are larger than the holes in the more downstream disc. The diameter of the holes is preferably in the range of from about $\frac{1}{4}$ inch or about 3/16 inch to about $2\frac{1}{4}$ inch. The walls of the holes preferably are straight (as shown in FIGS. 5 and 6) although it may be suitable to provide holes which have a slanted shape, curved shape or any other shape. For example, for some applications, it may be desirable to provide holes which have an acute angle edge at the front surface of a disc (i.e., the surface facing upstream) at the back edge of the hole relative to the direction of rotation of the disc.

Suitable flow rates through the comminuting apparatus vary widely depending on the nature of the material being comminuted, the pressure within the comminuting apparatus, the relative size of the comminuting apparatus and the rate of rotation of the spindle of the comminuting apparatus.

The sizes of the elements in the comminuting apparatus may vary widely depending on the application for which the apparatus is used. For example, for larger flow rates of materials containing large particles, the elements should be relatively larger. The relationship between the sizes of the various elements can also vary widely. The diameter of the discs (which is usually the same for all of the discs) is preferably from about 6 inches to about 17 inches, which preferably is from about 3 to about 5.5 times the diameter of the spindle. The diameter of the spacer is preferably from about 1.25 to about 2 times the diameter of the spindle. The thickness of the discs (which may or may not be the same for all of the discs) is preferably from about $\frac{1}{8}$ inch to about $\frac{3}{4}$ inch.

In accordance with another preferred feature in accordance with the present invention, the waste slurry nozzle 16 preferably has a reverse flow mechanism by which any material clogging the nozzle 16 can be forced out through the waste slurry inlet 23 and/or the air inlet 22.

Although the apparatus, slurries and methods in accordance with the present invention have been described in connection with preferred embodiments, it will be appreciated by those skilled in this art that additions, modifications, substitutions and deletions not specifically described may be made without departing from the spirit and scope of this invention as defined in the appended claims.

What is claimed is:

1. A burner for burning combustible materials, comprising:
    a first fuel nozzle and a second fuel nozzle, said second fuel nozzle comprising a first conduit for conveying a combustion material, a single second conduit for conveying a fluid stream, and an acceleration zone, said acceleration zone comprising a mixing chamber and an acceleration conduit, said first conduit having an inlet and an outlet, said second conduit having an entrance and an exit, said mixing chamber having an intake end and a release end, said acceleration conduit having a receiving end and a discharge end, said intake end of said mixing chamber communicating with said outlet of said first conduit and said exit of said second conduit, said release end of said mixing chamber communicating with said receiving end of said acceleration conduit, said mixing chamber tapering down from said intake end to said release end and said first conduit outlet and second conduit exit being arranged relative to said mixing chamber intake end such that said combustion material and fluid streams are mixed in said mixing chamber into a single combined stream.

2. A burner as recited in claim 1, wherein said first conduit and said acceleration conduit each have a longitudinal axis, said axis of said first conduit and said axis of said acceleration conduit being substantially coaxial.

3. A burner as recited in claim 1, wherein said first conduit is positioned inside of said second conduit.

4. A burner as recited in claim 1, wherein said second fuel nozzle is positioned inside of said first fuel nozzle.

5. A burner as recited in claim 1, wherein said second fuel nozzle is positioned so as to produce a flow which impinges a flame emanating from said first fuel nozzle.

6. A burner as recited in claim 1, further comprising a kiln having an up end and a down end, said burner being positioned in said down end of said kiln.

7. A burner for burning combustible materials, comprising a kiln operating at less than atmospheric pressure, said kiln having an up end and a down end, said burner being positioned in said down end of said kiln, the burner comprising:

a first fuel nozzle and a second fuel nozzle, said second fuel nozzle comprising a first conduit, a second conduit, and an acceleration zone, said acceleration zone comprising a mixing chamber and an acceleration conduit, said first conduit having an inlet and an outlet, said first conduit having a substantially linear axis, said second conduit having an entrance and an exit, said second conduit having a substantially linear axis, said mixing chamber having an intake end and a release end, said acceleration conduit having a receiving end and a discharge end, said acceleration conduit having a substantially linear axis, said intake end of said mixing chamber communicating with said outlet of said first conduit and said exit of said second conduit, said release end of said mixing chamber communicating with said receiving end of said acceleration conduit, said axis of said first conduit and said axis of said acceleration conduit being substantially coaxial, said axis of said second conduit and said axis of said first conduit being substantially parallel.

8. A burner for burning combustible materials, comprising:

a first fuel nozzle and a second fuel nozzle, said second fuel nozzle comprising a first conduit, a second conduit, and an acceleration zone, said acceleration zone comprising a mixing chamber and an acceleration conduit, said first conduit having an inlet and an outlet, said first conduit having an interior diameter in the range of from about 1.0 to about 2.5 inches, said first conduit being positioned inside said second conduit, said second conduit having an entrance and an exit, said second conduit having an interior diameter in the range of from about 3.0 to about 5.0 inches, said mixing chamber having an intake end and a release end, said acceleration conduit having a receiving end and a discharge end, said acceleration conduit having an interior diameter in the range of from about 1.0 to about 2.5 inches, said intake end of said mixing chamber communicating with said outlet of said first conduit and said exit of said second conduit, said release end of said mixing chamber communicating with said receiving end of said acceleration conduit.

9. A burner as recited in claim 8, wherein said first conduit has a substantially linear axis, said acceleration conduit has a substantially linear axis, said axis of said first conduit and said axis of said acceleration conduit being substantially coaxial.

10. A burner as recited in claim 8, further comprising a kiln having an up end and a down end, said burner being positioned in said down end of said kiln.

11. A burner nozzle comprising:

a first conduit having an inlet and an outlet, a second conduit having an entrance and an exit, and an acceleration zone comprising a mixing chamber and an acceleration conduit, said mixing chamber having an intake end and a release end, said acceleration conduit having a receiving end and a discharge end;

said intake end of said mixing chamber communicating with said outlet of said first conduit and said exit of said second conduit, said release end of said mixing chamber communicating with said receiving end of said acceleration conduit;

said acceleration zone being of a length in the range of from about 10 to about 30 times an interior diameter of said acceleration conduit.

12. A nozzle as recited in claim 11, wherein said mixing chamber is tapered between said intake end of said mixing chamber and said release end of said mixing chamber, the ratio of the difference between the cross-sectional areas of said intake end and said release end, divided by a distance between said intake end and said release end being in the range of from about 0.5 to about 2.0.

13. A nozzle as recited in claim 11, wherein said first conduit is positioned inside of said second conduit.

14. A nozzle as recited in claim 11, wherein said air conduit is 3 inch interior diameter steel pipe and is about 87.5 inches long, said waste conduit is 1.5 inch interior diameter steel pipe and is about 115.5 inches long, said mixing chamber tapers from a 3 inch interior diameter at said intake end to a 1.25 inch interior diameter at said release end, said mixing chamber is about 3.5 inches long, and said acceleration conduit is 1.25 inch interior diameter steel pipe and is about 26.5 inches long.

15. Combustible material burning apparatus including a burner cooperating with a combustion chamber operated at less than atmospheric pressure, said burner comprising:

a first fuel nozzle and a second fuel nozzle, said second fuel nozzle comprising a first conduit, a second conduit, and an acceleration zone, said acceleration zone comprising a mixing chamber and an acceleration conduit, said first conduit having an inlet and an outlet, said second conduit having an entrance and an exit, said mixing chamber having an intake end and a release end, said acceleration conduit having a receiving end and a discharge end, said intake end of said mixing chamber communicating with said outlet of said first conduit and said exit of said second conduit, said release end of said mixing chamber communicating with said receiving end of said acceleration conduit, said mixing chamber tapering down from said intake end to said release end.

16. A burner nozzle comprising:

a first conduit, a second conduit, and an acceleration zone, said acceleration zone comprising a mixing chamber and an acceleration conduit, said first conduit having an inlet and an outlet, said second conduit having an entrance and an exit, said first conduit and said second conduit having parallel longitudinal axes, said first conduit outlet being non-concentrically disposed with respect to the second conduit exit, said mixing chamber having a receiving end and a discharge end, said intake end of said mixing chamber communicating with said outlet of said first conduit and said exit of said second conduit, said release end of said mixing chamber communicating with said receiving end of said acceleration conduit, said mixing chamber tapering down from said intake end to said release end.

17. A burner nozzle comprising:

a first conduit, a second conduit, and an acceleration zone, said first conduit, but not said second conduit, being coaxially disposed relative to said acceleration conduit, said acceleration zone comprising a mixing chamber and an acceleration conduit, said first conduit having an inlet and an outlet, said second conduit having an entrance and an exit, said first conduit and said second conduit having parallel longitudinal axes, said mixing chamber having an intake end and a release end, said acceleration conduit having a receiving end and a discharge end, said intake end of said mixing chamber communicating with said outlet of said first conduit and said exit of said second conduit, said release end of said mixing chamber communicating with said receiving end of said acceleration conduit, said mixing chamber tapering down from said intake end to said release end.

18. A burner nozzle comprising:

a first conduit, a second conduit, and an acceleration zone, said acceleration zone comprising a mixing chamber and an acceleration conduit, said first conduit having an inlet and an outlet, said second conduit having an entrance and an exit, said second conduit exit being on the order of twice as large as said first conduit outlet, said mixing chamber having an intake end and a release end, said acceleration conduit having a receiving end and a discharge end, said intake end of said mixing chamber communicating with said outlet of said first conduit and said exit of said second conduit, said release end of said mixing chamber communicating with said receiving end of said acceleration conduit, said mixing chamber tapering down from said intake end to said release end so as to define a sloping surface, and said second conduit exit is arranged relative to said mixing chamber intake end such that a stream flowing through said second conduit is deflected by said sloping surface.

19. A burner for burning combustible materials, comprising:

a first fuel nozzle and a second fuel nozzle, said second fuel nozzle comprising a first conduit, a second conduit, and an acceleration zone, said acceleration zone comprising a mixing chamber and an acceleration conduit, said first conduit having an inlet and an outlet, said second conduit having an entrance and an exit, said mixing chamber having an intake end and a release end, said acceleration conduit having a receiving end and a discharge end, said intake end of said mixing chamber communicating with said outlet of said first conduit and said exit of said second conduit, said release end of said mixing chamber communicating with said receiving end of said acceleration conduit, said mixing chamber tapering down from said intake end to said release end, wherein the ratio of the difference between the cross sectional areas of said intake end and said release end, divided by a distance between said intake end and said release end is in the range of from about 0.5 to about 2.0.

20. A nozzle as recited in claim 16, wherein said first conduit is disposed within said second conduit.

21. A nozzle as recited in claim 17, wherein said first conduit is disposed within said second conduit.

* * * * *